United States Patent
Aoki et al.

(10) Patent No.: US 12,431,659 B2
(45) Date of Patent: Sep. 30, 2025

(54) CONNECTOR WITH SIMULTANEOUSLY OPERABLE CAPS

(71) Applicant: YAZAKI CORPORATION, Tokyo (JP)

(72) Inventors: Yusuke Aoki, Kakegawa (JP); Takashi Tsukamoto, Kakegawa (JP); Naoto Ikeya, Kakegawa (JP); Hidetaka Hondo, Sagamihara (JP); Miyu Komura, Sagamihara (JP)

(73) Assignee: YAZAKI CORPORATION, Tokyo (JP)

( * ) Notice: Subject to any disclaimer, the term of this patent is extended or adjusted under 35 U.S.C. 154(b) by 290 days.

(21) Appl. No.: 18/457,243

(22) Filed: Aug. 28, 2023

(65) Prior Publication Data
US 2023/0402784 A1 Dec. 14, 2023

Related U.S. Application Data

(63) Continuation of application No. PCT/JP2022/040845, filed on Oct. 31, 2022.

(30) Foreign Application Priority Data

Nov. 2, 2021 (JP) ................ 2021-179594

(51) Int. Cl.
*H01R 13/453* (2006.01)
*B60L 53/16* (2019.01)
*H01R 13/639* (2006.01)

(52) U.S. Cl.
CPC ..... *H01R 13/4532* (2013.01); *H01R 13/6395* (2013.01); *B60L 53/16* (2019.02)

(58) Field of Classification Search
CPC .... H01R 13/447; H01R 13/44; H01R 13/453; H01R 13/4532; H01R 13/5213;
(Continued)

(56) References Cited

U.S. PATENT DOCUMENTS

| | | | | |
|---|---|---|---|---|
| 5,545,046 A | * | 8/1996 | Masuda | B60L 53/31 439/142 |
| 5,686,701 A | * | 11/1997 | Fukushima | H01R 13/447 174/67 |
| 2014/0162480 A1 | * | 6/2014 | Schutte | H01R 13/447 439/142 |

FOREIGN PATENT DOCUMENTS

| | | | | |
|---|---|---|---|---|
| JP | H08-31497 A | | 2/1996 | |
| KR | 20200041498 A | * | 4/2020 | ............. B60L 53/16 |

OTHER PUBLICATIONS

English Translation of KR20200041498 (Year: 2025).*
(Continued)

*Primary Examiner* — Tulsidas C Patel
*Assistant Examiner* — Carlos E Lopez-Pagan
(74) *Attorney, Agent, or Firm* — KENEALY VAIDYA LLP (57) ABSTRACT

A connector includes a housing having a first connection portion and a second connection portion adjacent to the first connection portion, a first cap and a second cap pivotally supported by the housing respectively to be displaceable between an open position where the first and second connection portions are exposed to outside and a closed position where the first and second connection portions are shielded from the outside, a first lock and a second lock rotatably supported by the housing configured to lock the first cap and the second cap respectively. The second lock has a power transmission portion configured to transmit a rotational force in a lock releasing direction of the second lock to the first lock such that the first cap and the second cap are integrally displaced to the open position.

3 Claims, 6 Drawing Sheets (58) Field of Classification Search
CPC ..... H01R 13/6395; B60L 53/10; B60L 53/14; B60L 53/16; H02J 7/00
USPC ........................................................ 439/136
See application file for complete search history.

(56) References Cited

OTHER PUBLICATIONS

International Search Report and Written Opinion of the International Search Report for PCT/JP2022/040845 dated Dec. 27, 2022.

\* cited by examiner

CONNECTOR WITH SIMULTANEOUSLY OPERABLE CAPS

CROSS-REFERENCE TO RELATED APPLICATIONS

The present application is a continuation application of PCT/JP2022/040845 that claims priority to Japanese Patent Application No. 2021-179594 filed on Nov. 2, 2021, the entire content of which is incorporated herein by reference.

TECHNICAL FIELD

The present disclosure relates to a connector.

BACKGROUND ART

An electric vehicle runs by charging a built-in power supply (rechargeable battery) mounted therein and driving a DC motor. As a method of charging a built-in power supply, there are normal charging (so-called AC charging) performed using a commercial power supply at home, and quick charging (so-called DC charging) performed by a power feeding device installed in a power feeding station or the like. For this reason, a power receiving connector provided with a power receiving unit for normal charging (hereinafter also referred to as a "normal power receiving unit") and a power receiving unit for quick charging (hereinafter also referred to as a "quick power receiving unit") is mounted on the electric vehicle. Such a power receiving connector is provided with caps for shielding the normal power receiving unit and the quick power receiving unit from being exposed to the outside at the time of non-charging as disclosed, for example, in JPH08-31497A.

An alternating current is used in the normal charging, and a direct current is used in the quick charging.

In general, standards are established for power receiving connectors, and one of the standards is to use only the normal power receiving unit during normal charging, and to use the normal power receiving unit in addition to the quick power receiving unit during quick charging. In the above standard, during normal charging, only a cap for the normal power receiving unit is required to be opened, but during quick charging, the cap for the normal power receiving unit is also required to be opened in addition to a cap for the quick power receiving unit.

A connector according to the embodiment is excellent in workability in which two caps can be opened simultaneously.

SUMMARY OF INVENTION

A connector includes a housing having a first connection portion and a second connection portion adjacent to the first connection portion, a first cap pivotally supported by the housing to be displaceable between an open position where the first connection portion is exposed to outside and a closed position where the first connection portion is shielded from the outside, a second cap pivotally supported by the housing to be displaceable between an open position where the second connection portion is exposed to the outside and a closed position where the second connection portion is shielded from the outside, a first lock rotatably supported by the housing to lock the first cap when the first cap is located at the closed position, and a second lock rotatably supported by the housing to lock the second cap when the second cap is located at the closed position. The second lock includes a power transmission portion configured to transmit a rotational force in a lock releasing direction of the second lock to the first lock as a rotational force in a lock releasing direction of the first lock such that the first cap and the second cap are integrally displaced to the open position.

DESCRIPTION OF EMBODIMENTS

Embodiment

Hereinafter, a connector 1 according to an embodiment of the present disclosure will be described with reference to the drawings. The connector 1 is, for example, a power receiving connector (so-called vehicle inlet) mounted on a vehicle of an electric vehicle.

Hereinafter, for convenience of description, "front", "rear", "left", "right", "upper", and "lower" are defined as illustrated in FIGS. 1 to 7. A "front-rear direction", a "left-right direction", and an "upper-lower direction" are orthogonal to one another. When the connector 1 is mounted on a vehicle, the "front-rear direction", the "left-right direction", and the "upper-lower direction" correspond to the front-rear direction, the left-right direction, and the upper-lower direction of the vehicle, respectively. In addition, the front-rear direction corresponds to a fitting direction of the connector 1 and a power feeding connector. A locking direction and a lock releasing direction in the present embodiment are respectively the locking direction and the lock releasing direction of a first lock 40 and a second lock 50.

As shown in FIGS. 1 to 5, the connector 1 includes a housing 10 having a first connection portion 13 and a second connection portion 14, a first cap 20 rotatably supported by the housing 10, a second cap 30 rotatably supported by the housing 10, a first lock 40 capable of locking the first cap 20, and a second lock 50 capable of locking the second cap 30. Hereinafter, the housing 10, the first cap 20, the second cap 30, the first lock 40, and the second lock 50 constituting the connector 1 will be described in this order.

First, the housing 10 will be described. As shown in FIGS. 1 to 5, the housing 10 is integrally formed with a substantially rectangular box-shaped body portion 11, and a hood portion 12 which is provided on a front end surface of the body portion 11, opens forward, and has an accommodation space S inside.

A pair of cap-side support shaft portions 15 protruding leftward are provided on an outer surface of a left peripheral wall of the hood portion 12. The pair of cap-side support shaft portions 15 are arranged side by side at a predetermined interval in the upper-lower direction on the left peripheral wall of the hood portion 12.

A pin-shaped cap rotation shaft portion 15a is provided on each of the pair of cap-side support shaft portions 15. A pair of arm portions 22 of the first cap 20, which will be described later, are rotatably supported on the upper cap rotation shaft portion 15a, and a pair of arm portions 32 of the second cap 30, which will be described later, are rotatably supported on the lower cap rotation shaft portion 15a. In addition, a spring 80 is pivotally supported on each of the cap rotation shaft portions 15a (see FIGS. 2 and 3).

A pair of lock-side support shaft portions 16 protruding rightward are provided on an outer surface of a right peripheral wall of the hood portion 12. The pair of lock-side support shaft portions 16 are arranged side by side at a predetermined interval in the upper-lower direction on the right peripheral wall of the hood portion 12.

The pair of lock-side support shaft portions 16 are respectively provided with pin-shaped lock rotation shaft portions 16a. A pair of arm portions 42 of the first lock 40, which will be described later, are rotatably supported on the upper lock rotation shaft portion 16a, and a pair of arm portions 52 of the second lock 50, which will be described later, are rotatably supported on the lower lock rotation shaft portion 16a. In addition, springs 70 are pivotally supported on the lock rotation shaft portions 16a, respectively (see FIG. 5).

Figure 3:
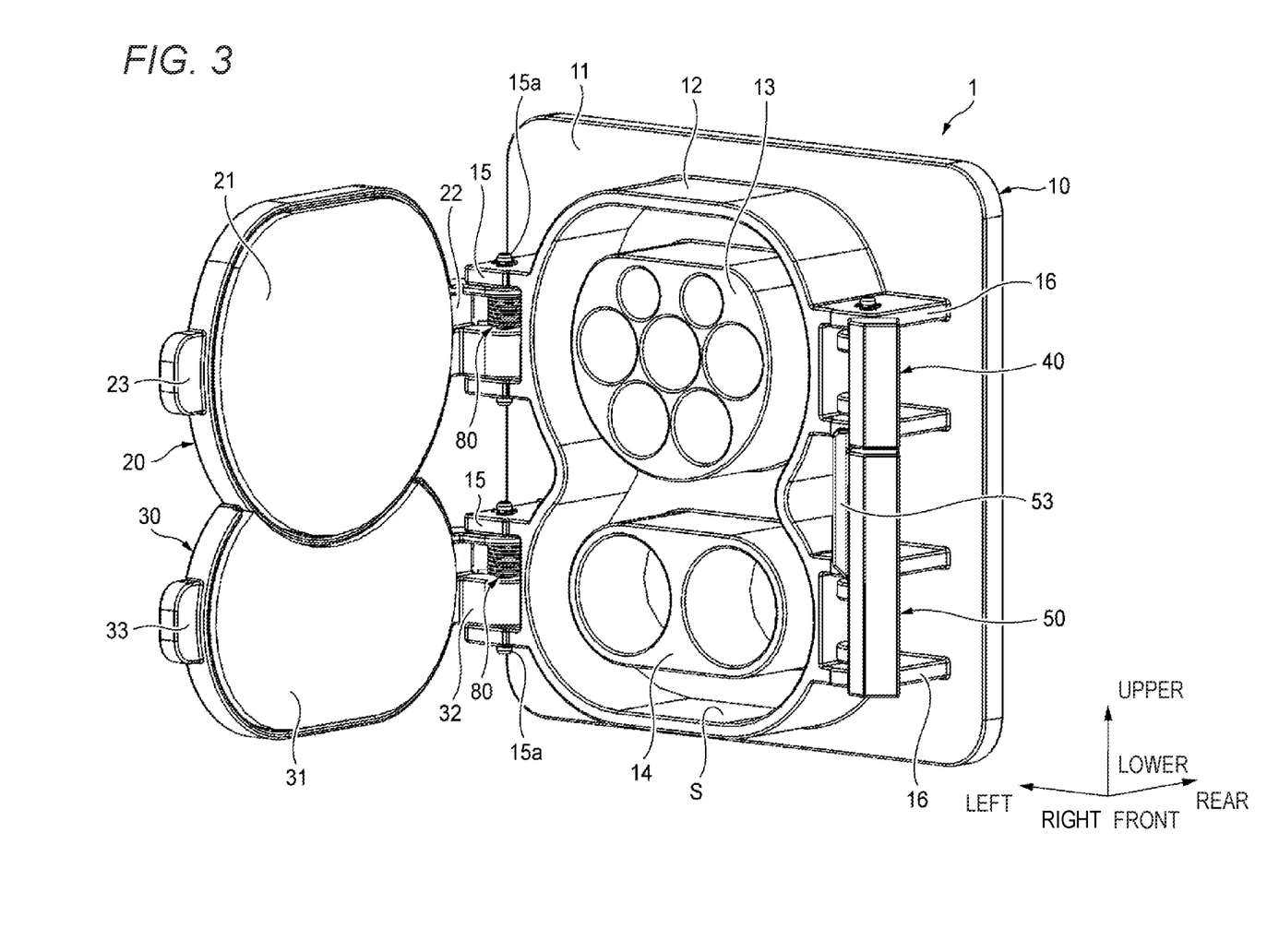
FIG. 3 is a view showing an aspect of the connector shown in FIG. 1 during quick charging.

The housing 10 further includes the first connection portion 13 and the second connection portion 14 in the accommodation space S of the hood portion 12 (see FIG. 3). A plurality of terminals (not shown) are accommodated in the first connection portion 13. Similarly, a plurality of terminals (not shown) are accommodated in the second connection portion 14. In the connector 1, a power feeding connector for normal charging is connected to the first connection portion 13 during normal charging, and a connector for quick charging is connected to the first connection portion 13 and the second connection portion 14 during quick charging.

Next, the first cap 20 will be described. As shown in FIGS. 1 to 4, the first cap 20 is integrally formed with a body portion 21 that closes an upper portion of an opening of the hood portion 12 at a closed position described later, the pair of arm portions 22 that are rotatably supported by the cap rotation shaft portion 15a of the housing 10, and a locking portion 23 that is locked to the first lock 40 at the closed position. The body portion 21 has a shape corresponding to the opening of the hood portion 12.

The first cap 20 can be displaced between an open position (see FIGS. 2 and 3) where the first connection portion 13 of the housing 10 is exposed to the outside, and the closed position (see FIGS. 1 and 4) where the first connection portion 13 is shielded from the outside (that is, the upper portion of the opening of the hood portion 12 is closed).

Further, when the first cap 20 is located at the closed position, a force in an opening direction of the first cap 20 (that is, the clockwise direction when viewed from above in an axial direction) is applied by the spring 80 which is axially supported by the cap rotation shaft portion 15a. That is, when the first cap 20 is not locked to the first lock 40, the first cap 20 is maintained in the open position by the spring 80. Note that when the first cap 20 is located at the open position, it is sufficient that the force in the opening direction of the first cap 20 is applied by the spring 80 to an extent that the first cap 20 is not displaced to the closed position by itself.

Next, the second cap 30 will be described. As shown in FIGS. 1 to 4, the second cap 30 is integrally formed with a body portion 31 that closes a lower portion of the opening of the hood portion 12 at a closed position described later, the pair of arm portions 32 that are rotatably supported by the cap rotation shaft portion 15a of the housing 10, and a locking portion 33 that is locked to the second lock 50 at the closed position. The body portion 31 has a shape corresponding to the opening of the hood portion 12.

The second cap 30 can be displaced between an open position (see FIG. 3) where the second connection portion 14 of the housing 10 is exposed to the outside, and the closed position (see FIGS. 1 and 4) where the second connection portion 14 is shielded from the outside (that is, the lower portion of the opening of the hood portion 12 is closed).

That is, when the first cap 20 and the second cap 30 are both located at the closed position, the opening of the hood portion 12 is closed by the first cap 20 and the second cap 30.

Further, when the second cap 30 is located at the closed position, a force in an opening direction of the second cap 30 (that is, the clockwise direction when viewed from above in the axial direction) is applied by the spring 80 which is axially supported by the cap rotation shaft portion 15a. That is, when the second cap 30 is not locked to the second lock 50, the second cap 30 is maintained in the open position by the spring 80. Note that when the second cap 30 is located at the open position, it is sufficient that the force in the opening direction of the second cap 30 is applied by the spring 80 to an extent that the second cap 30 is not displaced to the closed position by itself.

Figure 5:
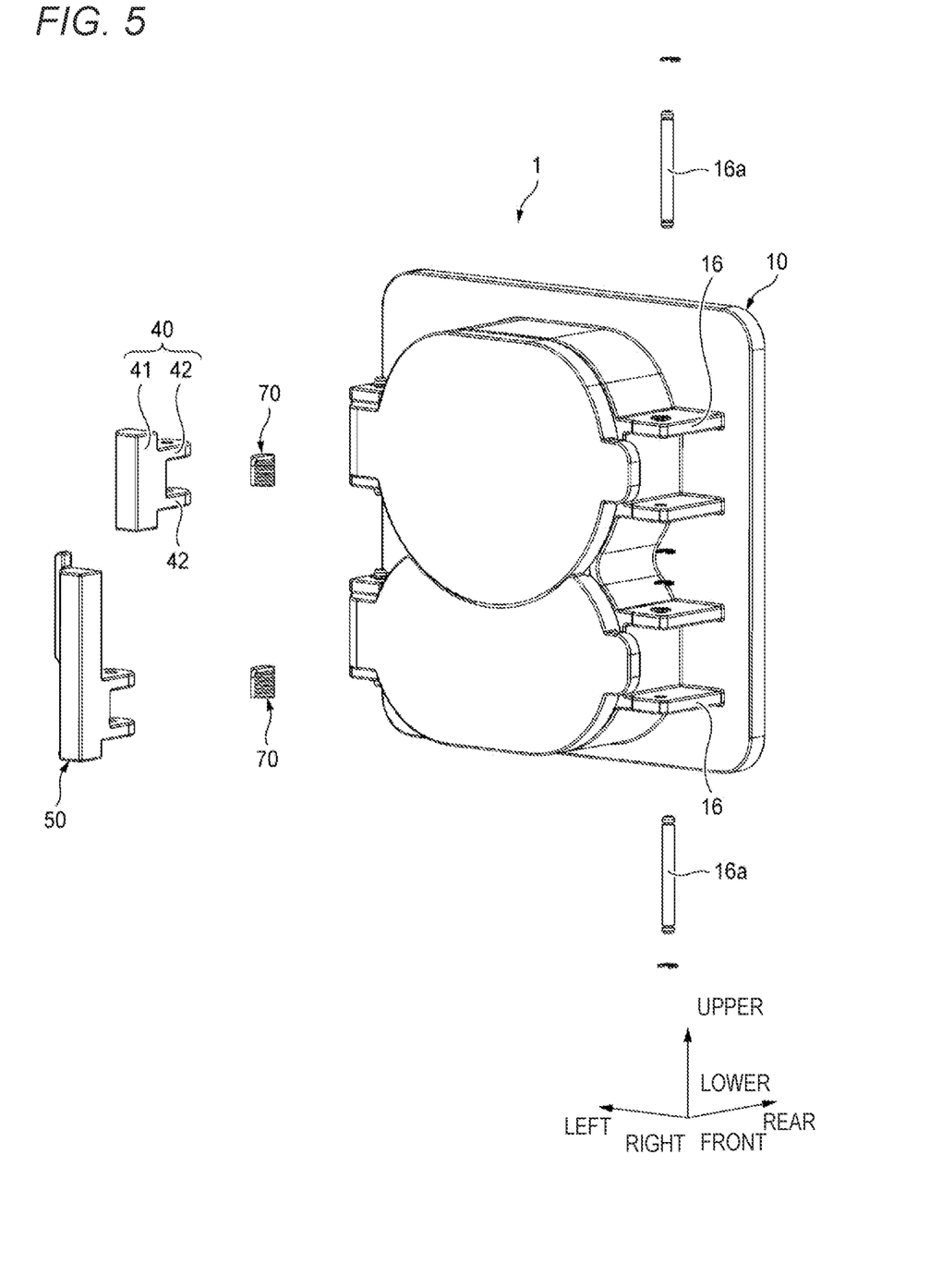
FIG. 5 is an exploded perspective view of the connector shown in FIG. 1.

Next, the first lock 40 will be described. As shown in FIG. 5, the first lock 40 is integrally formed with a body portion 41 having a locked portion (not shown) to which the locking portion 23 of the first cap 20 is locked when the first cap 20 is located at the closed position, and a pair of arm portions 42 rotatably supported by the lock rotation shaft portion 16a at a position corresponding to the upper lock-side support shaft portion 16. The locked portion is, for example, a recessed portion (in FIG. 1, a portion of a rear end surface of the body portion 41 is recessed forward) accommodating the locking portion 23 when the first cap 20 is located at the closed position, and the locking portion 23 is locked by accommodating the locking portion 23.

A position where the first lock 40 locks the first cap 20 is set as an initial position. In addition, a force in the locking direction (that is, the clockwise direction when viewed from above in the axial direction) is applied to the first lock 40 by the spring 70 which is rotatably supported by the lock rotation shaft portion 16a. That is, the first lock 40 is maintained at the initial position unless operated in the lock releasing direction (that is, the counterclockwise direction when viewed from above in the axial direction), and even if the first lock 40 is operated in the lock releasing direction, the spring 70 returns the first lock 40 to the initial position after the operation is completed.

Next, the second lock 50 will be described. As shown in FIG. 5, the second lock 50 is integrally formed with a body portion 51 having a locked portion (not shown) to which the locking portion 33 of the second cap 30 is locked when the second cap 30 is located at the closed position, a pair of arm portions 52 rotatably supported by the lock rotation shaft portion 16a at a position corresponding to the lower lock-side support shaft portion 16, and a rib-shaped power transmission portion 53 extending in the upper-lower direction. The locked portion is, for example, a recessed portion (in FIG. 1, a portion of a rear end surface of the body portion 51 is recessed forward) accommodating the locking portion 33 when the second cap 30 is located at the closed position, and the locking portion 33 is locked by accommodating the locking portion 33.

A position where the second lock 50 locks the second cap 30 is set as an initial position. In addition, a force in the locking direction (that is, the clockwise direction when viewed from above in the axial direction) is applied to the second lock 50 by the spring 70 which is rotatably supported by the lock rotation shaft portion 16a. That is, the second lock 50 is maintained at the initial position unless operated in the lock releasing direction (that is, the counterclockwise direction when viewed from above in the axial direction), and even if the second lock 50 is operated in the lock releasing direction, the spring 70 returns the second lock 50 to the initial position after the operation is completed.

The power transmission portion 53 is provided on an end surface (left end surface in FIG. 4) on a locking direction side of the body portion 51. An upper end portion of the power transmission portion 53 protrudes upward from an upper end surface 51a of the body portion 51. That is, a protruding portion of the power transmission portion 53 comes into contact with the first lock 40 only on the locking direction side. Specifically, a contact surface 53a that is an end surface (right end surface in FIG. 4) of the protruding portion of the power transmission portion 53 on a lock releasing direction side comes into contact with an end surface (left end surface in FIG. 4) of the first lock 40 on the locking direction side.

The power transmission portion 53 has a function of transmitting a rotational force in the lock releasing direction of the second lock 50 to the first lock 40 as a rotational force in the lock releasing direction of the first lock 40 so that the first cap 20 and the second cap 30 are integrally displaced to the open position during quick charging.

The housing 10, the first cap 20, the second cap 30, the first lock 40, and the second lock 50 constituting the connector 1 have been described above.

Figure 1:
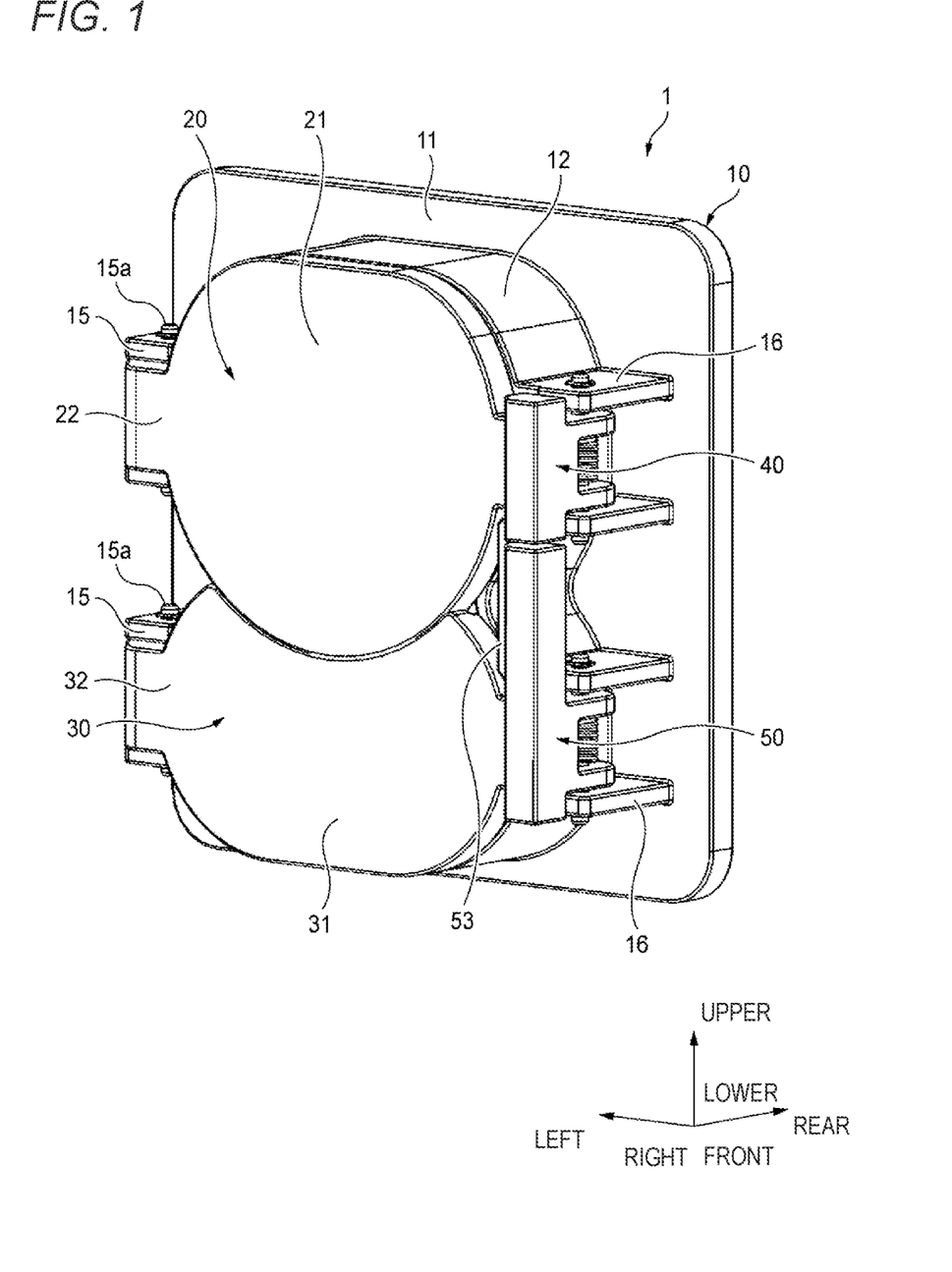
FIG. 1 is a perspective view of a connector according to an embodiment of the present disclosure, showing a non-charging aspect.
Figure 4:
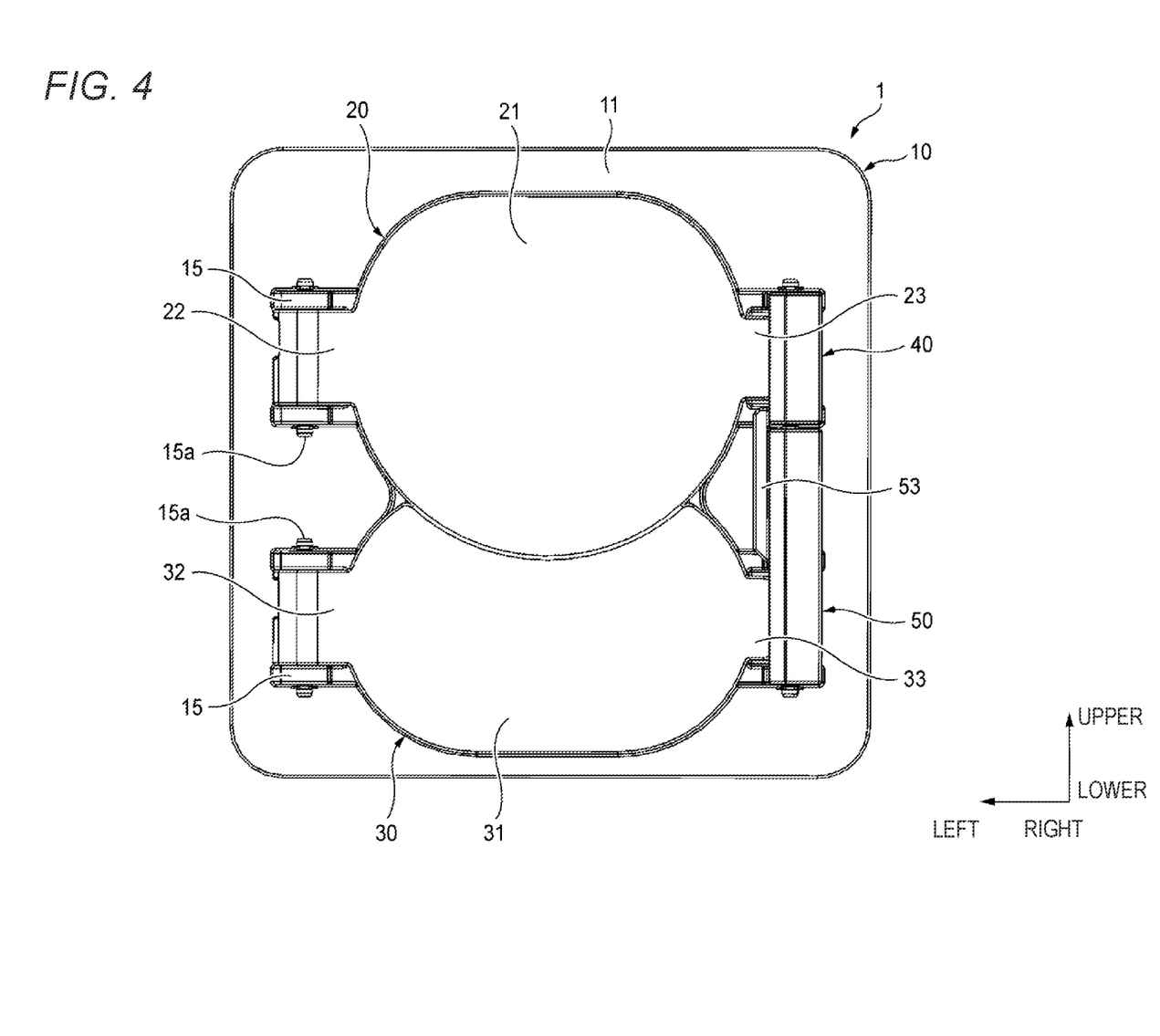
FIG. 4 is a front view of the connector shown in FIG. 1.

Next, each aspect of the connector 1 during non-charging, normal charging, and quick charging will be described. As shown in FIGS. 1 and 4, at the time of non-charging of the electric vehicle, the opening of the hood portion 12 is closed by the first cap 20 and the second cap 30 in the connector 1 so that the first connection portion 13 and the second connection portion 14 of the housing 10 are not exposed to the outside.

At this time, the first cap 20 is locked to the first lock 40, and the second cap 30 is locked to the second lock 50. Specifically, the locking portion 23 of the first cap 20 is locked to the locked portion (not shown) of the first lock 40, and the locking portion 33 of the second cap 30 is locked to the locked portion (not shown) of the second lock 50.

For example, when the electric vehicle is charged by the normal charging, it is necessary to perform an opening operation on the first cap 20. Specifically, the first lock 40 is rotated in the lock releasing direction to release the locking between the locking portion 23 of the first cap 20 and the locked portion of the first lock 40. When the locking between the first cap 20 and the first lock 40 is released, the first cap 20 is returned to the open position by the spring 80. When a power feeding connector for normal charging is connected to the first connection portion 13, normal charging of the electric vehicle is started.

Figure 2:
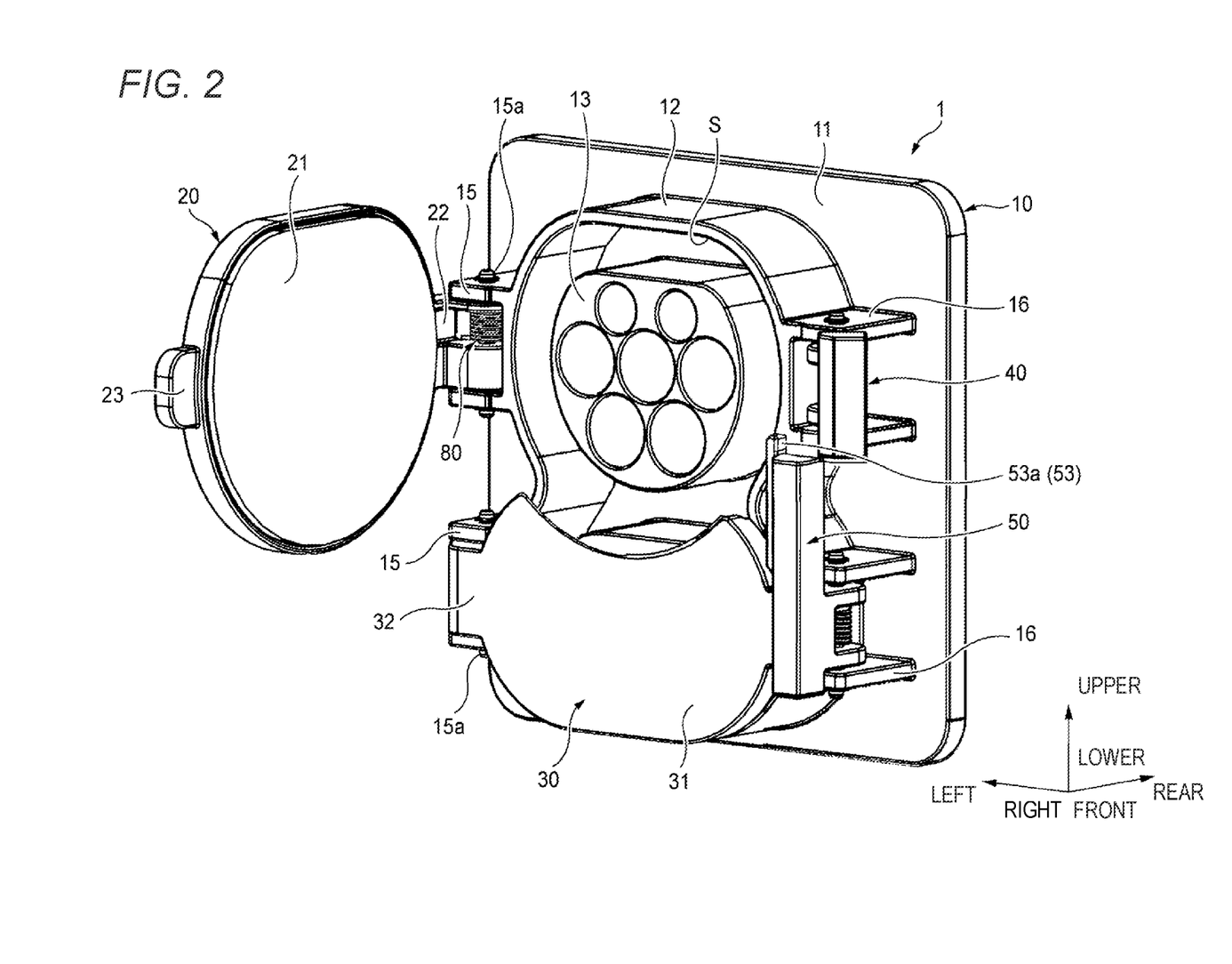
FIG. 2 is a view showing an aspect of the connector shown in FIG. 1 during normal charging.

That is, as shown in FIG. 2, at the time of normal charging of the electric vehicle, in the connector 1, the first cap 20 is positioned at the open position so that the first connection portion 13 is exposed to the outside, and the lower portion of the opening of the hood portion 12 is closed by the second cap 30 so that the second connection portion 14 is not exposed to the outside.

After the operation in the lock releasing direction is completed, the first lock 40 is returned to the initial position by the spring 70. In FIG. 2, the first lock 40 is not returned to the initial position for convenience of description.

Further, for example, when the electric vehicle is charged by quick charging, it is necessary to perform the opening operation on the first cap 20 and the second cap 30. Specifically, the second lock 50 is rotated in the lock releasing direction to release the locking between the locking portion 33 of the second cap 30 and the locked portion of the second lock 50, and to release the locking between the locking portion 23 of the first cap 20 and the locked portion of the first lock 40.

As described above, the power transmission portion 53 of the second lock 50 comes into contact with the first lock 40 only on the locking direction side (see FIG. 4). The right end surface of the power transmission portion 53 and the left end surface of the first lock 40 are in contact with each other taking the aspect at the time of non-charging shown in FIGS. 1 and 4 as an example.

Figure 6:
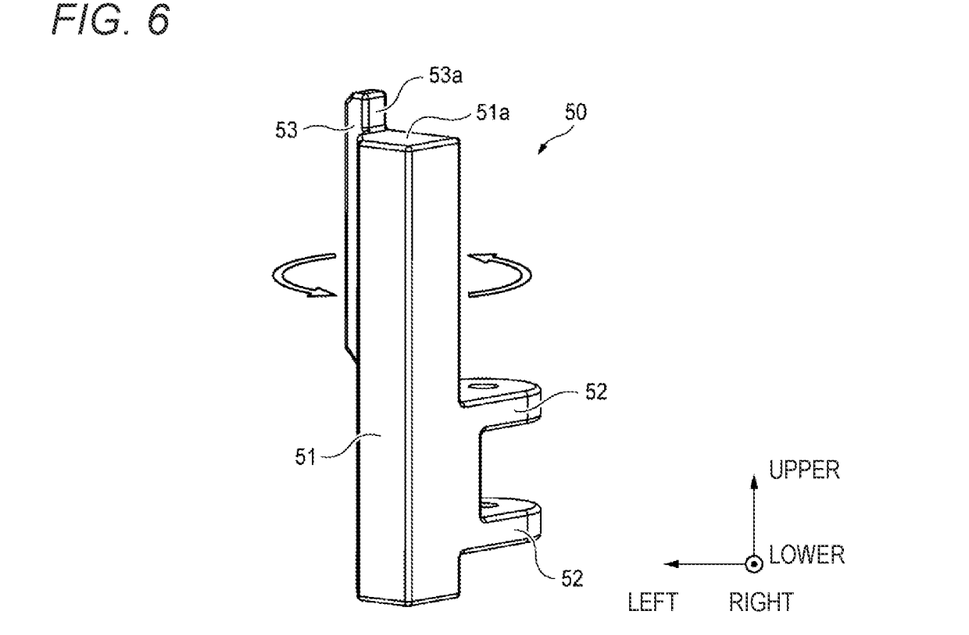
FIG. 6 is a front view of a second lock in the aspect shown in FIG. 1.
Figure 7:
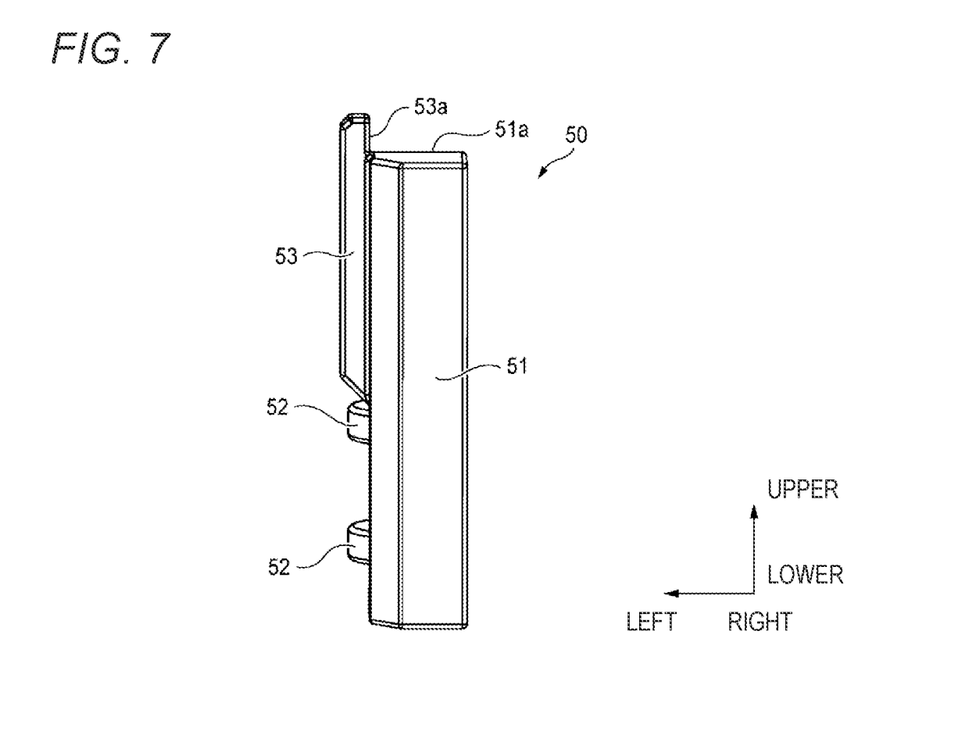
FIG. 7 is a front view of the second lock in the aspect shown in FIG. 3.

Thus, when the second lock 50 is operated in the lock releasing direction, the power transmission portion 53 naturally rotates in the lock releasing direction (see also arrows in FIG. 6). Since the contact surface 53a of the power transmission portion 53 and the left end surface of the first lock 40 are in contact with each other, the rotational force in the lock releasing direction of the power transmission portion 53 is transmitted to the first lock 40. That is, the first lock 40 also rotates in the lock releasing direction. Accordingly, the locking between the second cap 30 and the second lock 50 is released, and the locking between the first cap 20 and the first lock 40 is released. In other words, in the connector 1, the first cap 20 and the second cap 30 are integrally displaced to the open position where the first connection portion 13 and the second connection portion 14 are exposed to the outside by the power transmission portion 53.

As described above, if the locking between the second cap 30 and the second lock 50 is released and the locking between the first cap 20 and the first lock 40 is released, the first cap 20 and the second cap 30 are returned to the open position by the respective springs 80. When the power feeding connector for quick charging is connected to the first connection portion 13 and the second connection portion 14, quick charging of the electric vehicle is started.

That is, as shown in FIG. 3, at the time of quick charging of the electric vehicle, in the connector 1, the first cap 20 is positioned at the open position so that the first connection portion 13 is exposed to the outside, and the second cap 30 is positioned at the open position so that the second connection portion 14 is exposed to the outside. In other words, at the time of quick charging of the electric vehicle, the connector 1 is in a state in which the opening of the hood portion 12 is not closed.

After the operation in the lock releasing direction is completed, the first lock 40 and the second lock 50 are returned to the initial position by the respective springs 70. In FIG. 2, the first lock 40 is not returned to the initial position for convenience of description.

The first lock 40 and the second lock 50 according to the present embodiment have a so-called right opening structure. Therefore, in the present embodiment, rotation in the locking direction is clockwise rotation when viewed from above in the axial direction, and rotation in the lock releasing direction is counterclockwise rotation when viewed from above in the axial direction. In addition, the first cap 20 and the second cap 30 according to the present embodiment have a so-called left opening structure. Therefore, in the present embodiment, the opening direction of the first cap 20 and the second cap 30 corresponds to the clockwise direction when viewed from above in the axial direction. A closing direction of the first cap 20 and the second cap 30 corresponds to the counterclockwise direction when viewed from above in the axial direction.

The respective aspects of the connector 1 during non-charging, normal charging, and quick charging have been described above.

Note that the connector 1 according to the present embodiment conforms to the standard combined charging system type 2 (CCS 2). The connector 1 according to the present embodiment is also compatible with the standard combined charging system type 1 (CCS 1).

According to the connector 1 of the present embodiment, the power transmission portion 53 of the second lock 50 that locks the second cap 30 transmits the rotational force in the lock releasing direction of the second lock 50 to the first lock 40 that locks the first cap 20 as the rotational force in the lock releasing direction of the first lock 40, so that the first cap 20 and the second cap 30 are integrally displaced to the open position where the first connection portion 13 and the second connection portion 14 are exposed to the outside. Thus, the connector 1 according to the present embodiment can simultaneously open the two caps of the first cap 20 and the second cap 30 at the time of quick charging.

Further, according to the connector 1 of the present embodiment, the power transmission portion 53 comes into contact with the first lock 40 only on the locking direction side. Thus, when the second lock 50 is operated in the lock releasing direction, the power transmission portion 53 naturally rotates in the lock releasing direction. The rotational force is also transmitted to the first lock 40 via the power transmission portion 53, and the first lock 40 also rotates in the lock releasing direction. Thus, the connector 1 according to the present embodiment can simultaneously open the two caps of the first cap 20 and the second cap 30 at the time of quick charging.

Thus, the connector 1 according to the present embodiment is excellent in workability compared with a connector in the related art.

Further, according to the connector 1 of the present embodiment, the power transmission portion 53 is a rib that extends in the axial direction (that is, the upper-lower direction) of the rotation shaft of the second lock 50 and at least partially protrudes upward from the upper end surface 51a of the second lock. As described above, in the connector 1 of the present configuration, since the power transmission portion 53 has a rib shape, it is possible to secure sufficient strength by the power transmission portion 53 to transmit the rotational force to the first lock 40.

Other Embodiments

The present disclosure is not limited to the above-described embodiment, and can be appropriately modified, improved, or the like. In addition, materials, shapes, sizes, numbers, arrangement positions and the like of components in the above-described embodiments are freely selected and are not limited as long as the present disclosure can be implemented.

Here, characteristics of the connector according to the present embodiment described above will be briefly summarized and listed in the following (i) to (iii).

(i) A connector (1) including:
a housing (10) having a first connection portion (13) and a second connection portion (14) adjacent to the first connection portion;
a first cap (20) pivotally supported by the housing (10) to be displaceable between an open position (see FIGS. 2 and 3) where the first connection portion is exposed to outside and a closed position (see FIGS. 1 and 4) where the first connection portion is shielded from the outside;
a second cap (30) pivotally supported by the housing (10) to be displaceable between an open position (see FIG. 3) where the second connection portion is exposed to the outside and a closed position (see FIGS. 1 and 4) where the second connection portion is shielded from the outside;
a first lock (40) rotatably supported by the housing (10) to lock the first cap (20) when the first cap (20) is located at the closed position; and
a second lock (50) rotatably supported by the housing (10) to lock the second cap (30) when the second cap (30) is located at the closed position,
in which the second lock (50) includes a power transmission portion (53) configured to transmit a rotational force in a lock releasing direction of the second lock (50) to the first lock (40) as a rotational force in a lock releasing direction of the first lock (40) such that the first cap (20) and the second cap (30) are integrally displaced to the open position.

(ii) In the connector (1) according to (i), the power transmission portion (53) comes into contact with the first lock (40) only on a locking direction side.

(iii) In the connector (1) according to (i), the second lock (50) includes a body portion (51) to which the second cap (30) is locked when the second cap is located at the closed position, and
the power transmission portion (53) is a rib extending in an axial direction of a rotation shaft of the second lock (50) and protruding from an end surface (upper end surface 51a) of the body portion (51) on the first lock side toward a first lock side in the axial direction.

Although the present disclosure has been described in detail with reference to a specific embodiment, it is apparent to those skilled in the art that various changes and modifications can be made without departing from the spirit and scope of the present disclosure.

What is claimed is:
1. A connector comprising:
a housing having a first connection portion and a second connection portion adjacent to the first connection portion;
a first cap pivotally supported by the housing to be displaceable between an open position where the first connection portion is exposed to the outside and a closed position where the first connection portion is shielded from the outside;
a second cap pivotally supported by the housing to be displaceable between an open position where the second connection portion is exposed to the outside and a closed position where the second connection portion is shielded from the outside;

a first lock rotatably supported by the housing to lock the first cap when the first cap is located at the closed position; and a second lock rotatably supported by the housing to lock the second cap when the second cap is located at the closed position, wherein the second lock has a power transmission portion configured to transmit a rotational force in a lock releasing direction of the second lock to the first lock as a rotational force in a lock releasing direction of the first lock such that the first cap and the second cap are integrally displaced to the open position.

2. The connector according to claim 1, wherein the power transmission portion comes into contact with the first lock only on a locking direction side.

3. The connector according to claim 1, the second lock includes a body portion to which the second cap is locked when the second cap is located at the closed position, and wherein the power transmission portion is a rib extending in an axial direction of a rotation shaft of the second lock and protruding from an end surface of the body portion on a first lock side toward the first lock side in the axial direction.

* * * * *